Dec. 22, 1936.  F. BECKER  2,064,874
COLUMN BLINDING MECHANISM
Filed May 12, 1933  2 Sheets-Sheet 1
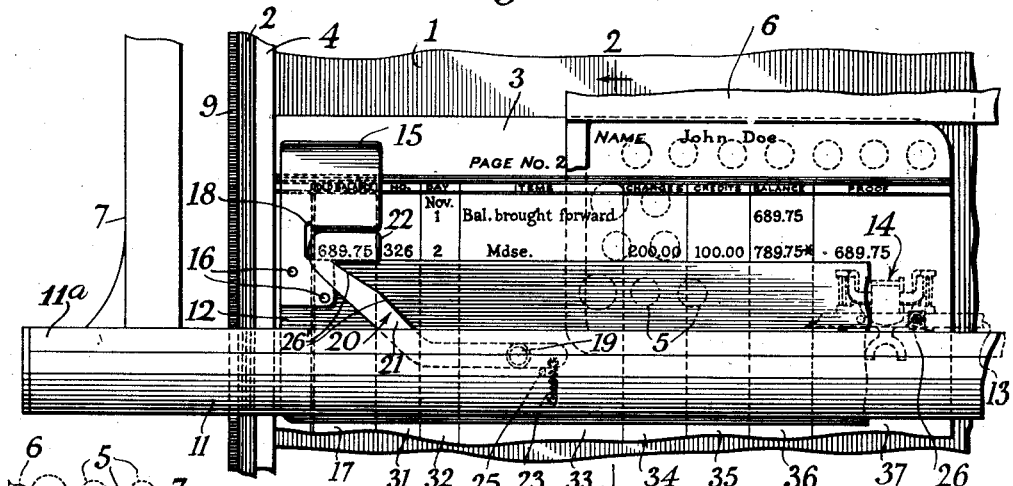
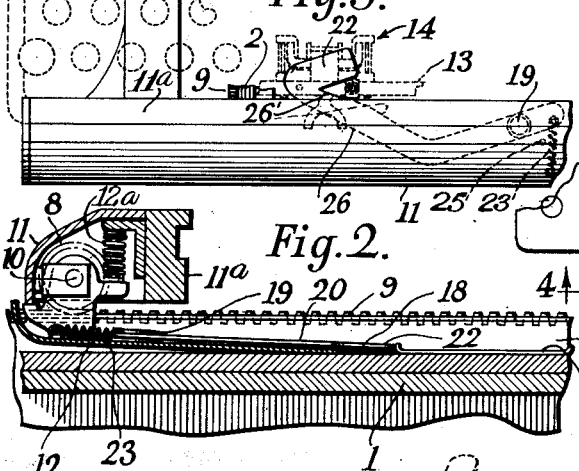
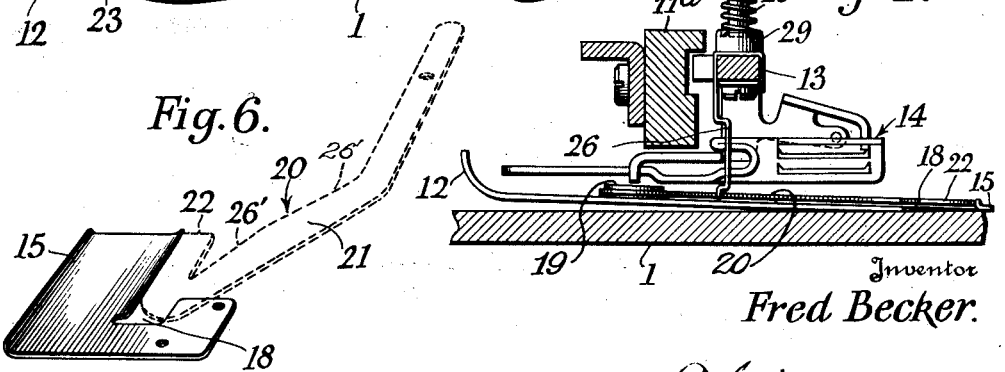
Inventor
Fred Becker.

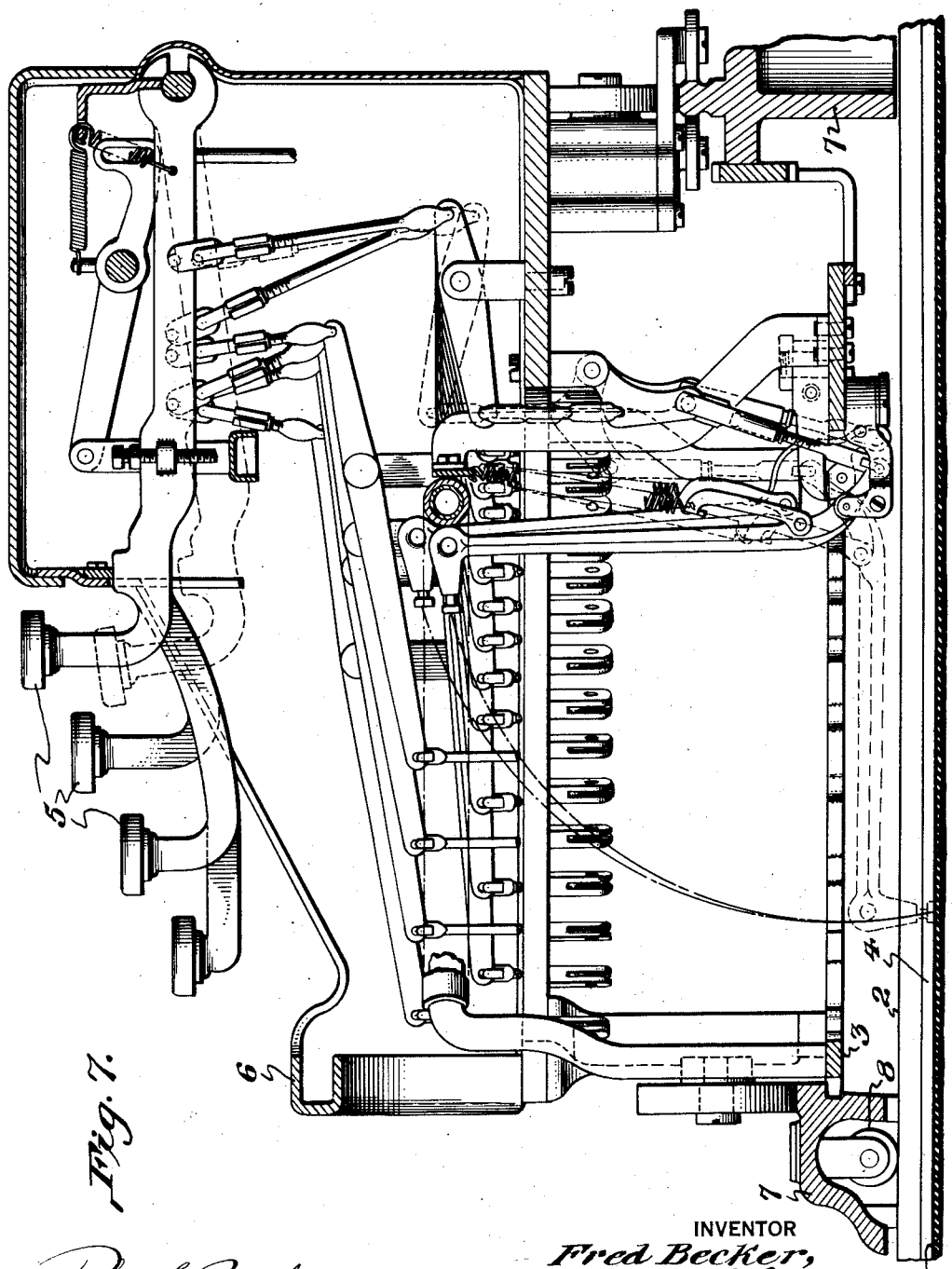

Patented Dec. 22, 1936

2,064,874

UNITED STATES PATENT OFFICE 2,064,874

COLUMN BLINDING MECHANISM

Fred Becker, Queens Village, N. Y., assignor, by mesne assignments, to Underwood Elliott Fisher Company, New York, N. Y., a corporation of Delaware Application May 12, 1933, Serial No. 670,652

11 Claims. (Cl. 235—59)

My invention relates to writing computing machines and more particularly to improvements in combined typewriting and computing machines of the class characterized by a flat platen and printing mechanism movable thereover for line and letter spacing, as exemplified by the Elliott-Fisher billing machine of commerce.

By way of explanation, in the use of these machines for the posting of a customer's account and the computation of the new balance, it is the practice to prove the correctness of the posting and accumulation of the old balance as follows. A ledger sheet is used having adjacent the left edge thereof an "Old balance" column, and adjacent the right hand edge, a "Balance" column followed by a "Proof" column. Intermediate the "Old balance" and "Balance" columns are the usual columns for such postings as the account number, date, items, charges or debits, and credits. The old balance, showing the condition of the customer's account at the end of the last posting, is indicated in the "Balance" column of the ledger sheet. In beginning a new posting, the old balance is copied from the "Balance" column, posted in the "Old balance" column, and run into a computing register and also into a proving register. The account number date items charges and credits are then posted in the appropriate columns the charges and credits being run into the computing register to ascertain the new balance. At this point, the computing register contains the new balance, and the proving register the old balance alone. The new balance is now entered in the "Balance" column and subtracted from the computing register to "clear" the same, which condition in the said register is usually next indicated on the record by clear signal mechanism printing a "star" and well understood in the art. Lastly, the old balance is printed in the "Proof" column and simultaneously subtracted from the proving register. This last operation should clear the proving register, thereby proving that the correct old balance has been posted in the "Old balance" column and run into the computing register. Obviously, if, in this proving operation, the old balance is copied from the "Old balance" column the proving register will be cleared, regardless of whether or not the old balance has been correctly copied from the original figures in the "Balance" column in the first place, and if such an error exists it will not be detected. Since the operator is not liable to err twice in copying said original figures, if he is forced, in the proving operation, to again copy the old balance from the "Balance" column any error in the first posting and accumulation of the old balance will be detected since the proving register will not "clear" and hence the clear signal mechanism with which it is also provided as will be understood, cannot be operated.

With the foregoing in mind, it is the principal object of my invention to provide a simple efficient mechanism for automatically blinding or screening the "Old balance" column coincidentally with movement of the printing point of the machine out of said column position, and automatically operable to ineffective position when the printing point of the machine again enters said column, whereby the old column balance in said column is hidden from view in a posting operation as soon as it is posted so that the operator is forced to resort to the "Balance" column for copying the old balance in the proving operation.

Another object of my invention is to provide mechanism of the character above set forth adapted for incorporation in the Elliott-Fisher billing machine for automatic operation by the carriage thereof to achieve the results above described.

Other objects and advantages more or less subordinate to those above enumerated are also comprehended by my invention, as will appear when the following description and claims are read in conjunction with the accompanying drawings.

In said drawings:

Figure 1 is a fragmentary top plan view of an Elliott-Fisher billing machine equipped with my novel column blinding or screening mechanism, the parts of the mechanism being shown in normal column blinding position, Fig. 2 is a detail longitudinal section drawn to an enlarged scale and taken on the line 2—2 of Fig. 1, Fig. 3 is a fragmentary enlarged view in top plan, of parts of the line space frame, carriage, and ribbon vibrator mechanism of the machine, together with an operating part of the blinding mechanism, and illustrating the location of said operating part with reference to the printing point of the machine.

Fig. 4 is a transverse section taken on the line 4—4 of Fig. 3,

Fig. 5 is a fragmentary top plan view illustrating the operation of the column blinding mechanism when the printing point of the machine is located in the "Old balance" column of the ledger sheet, Fig. 6 is a perspective view of cooperating shutter members forming part of the column blinding mechanism, and Fig. 7 is a sectional view of a traveling keyboard and printing mechanism, corresponding to Fig. 1 of U. S. Patent to Foothorap, No. 1,251,361.

Referring now to the drawings, 1 designates a portion of the usual flat platen of the Elliott-Fisher billing machine, and 2, the left side rail or member of the platen frame. As will be understood, the platen 1 in this type of machine, is vertically movable to clamp the work, in this instance a ledger sheet 3, between the side edges of the platen 1 and suitable clamping members, one of which extends as at 4, from each rail or side member of the frame. For a detailed disclosure of the platen moving and clamping features, reference may be had to U. S. Patent No. 1,596,420 issued to H. A. Foothorap, August 17, 1926. The printing mechanism, shown in Fig. 7, and keys 5 are mounted on a carriage 6 advanced, in a letter spacing direction, over the work, under control of the usual escapement, not shown, the carriage being mounted to travel on a line space frame, for instance, as in U. S. Patent No. 1,251,361 issued to H. A. Foothorap, December 25, 1917. The line space frame 7 is supported by rollers, one of which is shown at 8, (Fig. 2) for movement over the platen 1 to line space the printing point of the machine, and is geared to racks, one of which is shown at 9, for operation by line spacing mechanism, as featured in U. S. Patent No. 1,719,176 issued to H. A. Foothorap, July 2, 1929. Pivoted as at 10, within a shield 11 extending forwardly from the front bar 11a of the line space frame 7, is a depressor plate 12 yieldingly urged against the work, a spring 12a, (Figure 2) to depress and smooth the same as the line space frame 7 moves over the platen. Mounted on a bar 13 of the carriage 6 is ribbon vibrator mechanism 14 operated, as will be understood, by each key 5 to present the ribbon, not shown, at the printing point during the printing operation, such a mechanism being described in detail in U. S. Patent No. 1,286,573 issued to H. A. Foothorap, December 3, 1918.

The novel column blinding mechanism is mounted on top of the depressor plate 12, as follows. A fixed shutter member 15 (Figs. 1 and 6) is secured to the depressor plate 12, as at 16, to extend rearwardly over the "Old balance" column 17, and is rectangularly recessed at a point in registry with the printing line, as at 18, to uncover that portion of the "Old balance" column in which the old balance is to be printed, so that printing may be performed in said column. The fixed shutter member 15, preferably, extends for a sufficient distance to blind at least the five old balances in the "Old balance" column 17 immediately preceding the printing line so that the operator cannot inadvertently copy any of such old balances in the before-described proving operation. It is to be understood, however, that the invention is not to be viewed as restricted to the blinding of such prior old balances, only, but comprehends a fixed shutter 15 extended sufficiently to blind the entire column with the exception of the immediate printing line.

Pivoted, as at 19, on the depressor plate 12, is a movable shutter member 20, including a lever arm 21 normally extending diagonally of the path of letter spacing movement of the carriage 6 and terminating in a mask 22 which in the normal position of said member covers the recess 18 in the fixed shutter member 15. The mask is of rectangular shape and of an area generally conforming to the area of the recess 18. The rear edge of the mask 22 is adapted to lie parallel with and just beneath the upturned edge 18a of the fixed shutter member 15 defining the rear edge of the recess 18. A spring 23 having its opposite ends suitably secured to the movable shutter member 20 and to a stud 24 on the depressor plate 12, yieldingly retains said member 20 in normal position against a stop 25 located on the depressor plate 12 to limit movement of the member 20 under the urge of the spring 23.

Mounted, preferably, on the aforesaid carriage bar 13 is a shutter-operating arm 26 (best shown in Fig. 4) designed, when the carriage 6 is retracted to the left-hand margin, to engage a cam edge 26' on the lever arm 21 of member 20 to cam the latter against the urge of the spring 23 into the position shown in Fig. 5, in which position the mask 22 is moved to ineffective position, to uncover the recess 18 in the fixed shutter member 15. The shutter-operating arm 26 is so located, relatively to the ribbon-vibrating mechanism 14, that said mask 22 is moved to ineffective, uncovering position by retraction of the carriage 6 into a position to print in the "Old balance" column 17, and is moved by the spring 23 to effective, covering position coincidentally with advance of said carriage 6 out of said column. The lower end of the shutter-operating arm 26 preferably extends to a point close to the depressor plate 12 for operative relation to the shutter member 20. Since the depressor plate 12 has vertical play for obvious reasons, said shutter-operating arm 26 is mounted for yielding vertical play with said plate. Preferably for this purpose, said arm 26 is loosely mounted on an upright post 27, on the bar 13, and a spring 28 is interposed between a boss 29 on said arm and a nut 30 on said post, all as shown in Figure 4.

Referring to the operation of my invention, the operator locates the carriage 6 in position to print in the "Old balance" column, which operation engages the shutter-operating arm 26 with the cam edge 26' of the lever arm 21 to rock the latter and move the mask 22 to ineffective position. The customer's old balance may then be printed in the "Old balance" column 17 and entered into the accumulating and proving registers, simultaneously, which it has not been considered necessary to illustrate since their use and operation in connection with machines of this type are well understood in the art.

The inclined face 26' of the lever arm 21 is of sufficient extent to enable the shutter-operating arm 26 to displace the shutter or mask 22 a sufficient distance away from its masking position, so that as the printing point of the carriage 6, and the operating arm 26 recede in letter-spacing direction, from the inclined face 26', the shutter or mask 22, although restoring step by step towards its home position, under the influence of its spring 23, simultaneously with the retreat of the carriage, does not restore to its effective position until the printing point of the carriage passes out of the "Old balance" column; and the shutter remains in said position during the remaining steps in the posting operation. The operator, having made the necessary entries in the "No.", "Date", "Items", "Charges" and "Credits" columns, 31, 32, 33, 34 and 35, respectively, and having entered the new balance in the "Balance"

column 36 to clear the computing register, then writes the old balance in the "Proving" column 37 to clear the proving register for the purposes previously described. Obviously, in this last operation, copying the old balance from the "Balance" column 36 must be resorted to since the posting in the "Old balance" column 17 is concealed or blinded. It is to be particularly noted that said column 17 has been blinded, not only as to the old balance figure of the immediate posting, but also as to the prior postings in such column, and that such prior postings are successively concealed by the fixed shutter 15 incident to the line spacing of the carriage. Hence, after the carriage 6 has advanced beyond the "Old balance" column, and during printing in the remaining columns, no figures in the column 17 are visible at any time to catch the eye of the operator and which he might carry in his mind and print in the proving operation.

The foregoing constitutes a detailed description of a preferred embodiment of my invention, but it is to be understood that right is herein reserved to changes and modifications falling within the scope of the protection prayed.

What I claim is:

1. In a machine of the class described, the combination with a relatively movable work-supporting platen, and key mechanism, to enable the printing of numbers in different columnar zones on the work, of shiftable work-blinding mechanism normally effective to cover the instant writing line of one of said zones and only movable to ineffective, uncovering position by relative movement of the platen and key mechanism to begin the printing in said zone.

2. In a machine of the class described, the combination with a relatively movable work-supporting platen, and key mechanism, to enable the printing of numbers in different columnar zones on the work, of work-blinding mechanism normally effective to cover a unitary area of one zone, and including cooperating shutter members, one of which shutter members is movable to ineffective, uncovering position by relative movement of said platen and key mechanism immediately prior to commencing printing in a part of such unitary concealed area.

3. The combination with a work-supporting platen; and a travelling carriage; of work-blinding mechanism, including co-operable shutter members for normally covering a predetermined unitary area of the work, one of which shutters is movable into and out of juxtaposition to the other; and means for moving the movable shutter member under control of the carriage, only when the carriage is in position to enable the entry of values in the area normally concealed by the movable shutter.

4. The combination with a work-supporting platen; and a carriage adapted for advance and retraction; of work-blinding mechanism, including a mask shiftable to effective and to ineffective positions to cover and uncover, respectively, an area of the work, and normally in its effective position; and means on the carriage, for positively shifting the mask to its ineffective position when it is desired to write in such area.

5. The combination with a work-supporting platen, a traveling carriage, and a depressor plate adjustable to engage varying thicknesses of work sheets; of work-blinding mechanism, including a shutter member shiftably mounted on the depressor plate for movement to effective and ineffective positions to cover and uncover, respectively, an area of the work; the shutter member extending over the work, and movable with the depressor plate for adjustment therewith relatively to the work; and means for moving said shutter member under control of the carriage.

6. The combination with a work-supporting platen, a travelling carriage, and a depressor plate adjustable to engage varying thicknesses of work sheets; of work-blinding mechanism, including cooperating shutter members mounted on said plate, the shutter members extending over the work and movable with the depressor plate for adjustment therewith relatively to the work, and cooperatively adapted to conceal a unitary area of the work, one member being movable relatively to the other, to effective and ineffective positions, respectively; and means under control of the carriage for shifting the movable shutter member.

7. In a writing machine, the combination with a relatively movable work-supporting platen and a key mechanism, to enable the writing of numbers in different columnar zones across the work; of work-blinding mechanism, including a shiftable shutter member; means operable upon the shiftable shutter member to yieldingly hold it in, and return it to, position to mask the number last written in a predetermined column; and displacing means movable towards and from the shiftable shutter member to render the latter ineffective just prior to commencing to write the number to be concealed.

8. In a writing machine, the combination with a relatively movable work-supporting platen and a key mechanism, to enable the writing numbers in different columnar zones across the work; of work-blinding mechanism, including a shiftable shutter member; displacing means movable towards and from the shiftable shutter member to render the latter ineffective just prior to commencing to write the number to be concealed; and means to restore the shiftable shutter member as the particular number is written.

9. In a writing-computing machine having keys, the combination with key-operated type bars and a platen, relatively movable to enable the writing of numbers in different columnar zones on the work; of work-blinding mechanism, including a mask; means to normally retain the mask in its effective position covering that portion of a columnar zone corresponding with the instant printing line, and to restore the mask to its normal position; a lever to support the mask, and having a surface extending at an angle to the direction of travel of the movable element; and a finger extending from the movable element and adapted to contact with and slide along the angularly placed surface of the lever, to displace the mask when the movable element travels in one direction", so as to enable an amount to be printed in the normally concealed portion of the columnar zone immediately succeeding the displacement of the mask.

10. In a writing machine, the combination with relatively movable work-supporting and keyboard devices to enable the entry of items in different columnar zones on the work sheet; of work-blinding mechanism, including cooperable shutter members normally effective to cover an area in one columnar zone, one of the shutter members being relatively stationary, and another shutter member being relatively movable, with respect to the work; the stationary shutter member being recessed at the printing line across the particular column zone with which it is associated; the movable shutter member being shiftable to cover and uncover the recess in its cooperating shutter member, to conceal and to uncover the work at this point, and under control of one of the relatively movable devices, whereby to shift the movable shutter out of covering position only when the devices are in position to print in that column.

11. In a writing machine, the combination with relatively movable work-supporting, and keyboard devices, to enable the writing of members in different columnar zones across the work; of work-blinding mechanism, including cooperating stationary and shiftable shutter members adapted to normally conceal a unitary area in a selected columnar zone; the stationary shutter member being recessed; the shiftable shutter member being movable to cover and uncover the recess in the stationary shutter member; means operable by one of the relatively movable devices to shift the movable shutter out of covering position only when the relatively movable devices are in position to print in that column; and means operable upon the shiftable shutter member to yieldingly retain such member in position to cover the recess in the stationary shutter member.

FRED BECKER.